US012785998B2

(12) United States Patent
Hirama et al.

(10) Patent No.: US 12,785,998 B2
(45) Date of Patent: Nov. 3, 2026

(54) COMMUNICATION DEVICE, COMMUNICATION METHOD, AND PROGRAM FOR MOBILE INDUSTRY PROCESSOR INTERFACE PACKET GENERATION

(71) Applicant: Sony Semiconductor Solutions Corporation, Kanagawa (JP)

(72) Inventors: Takayuki Hirama, Tokyo (JP); Makoto Nariya, Kanagawa (JP); Hayato Takahashi, Tokyo (JP); Shinichi Watanabe, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 250 days.

(21) Appl. No.: 18/720,346

(22) PCT Filed: Jan. 13, 2023

(86) PCT No.: PCT/JP2023/000720
§ 371 (c)(1),
(2) Date: Jun. 14, 2024

(87) PCT Pub. No.: WO2023/145479
PCT Pub. Date: Aug. 3, 2023

(65) Prior Publication Data

US 2025/0055722 A1 Feb. 13, 2025

(30) Foreign Application Priority Data

Jan. 28, 2022 (JP) ................................ 2022-011502

(51) Int. Cl.
*H04L 12/28* (2006.01)
*H04L 69/324* (2022.01)

(52) U.S. Cl.
CPC ............ *H04L 12/28* (2013.01); *H04L 69/324* (2013.01)

(58) Field of Classification Search
CPC ............... H04L 12/28; H04L 12/40169; H04L 2012/40273; H04L 69/324
See application file for complete search history.

(56) References Cited

U.S. PATENT DOCUMENTS 11,102,445 B1 * 8/2021 Engelkemier .......... H04N 7/025
2020/0021633 A1 * 1/2020 Sengoku ............ G06F 13/4291
(Continued)

FOREIGN PATENT DOCUMENTS

JP 2021517368 A 7/2021
TW 202143685 A 11/2021
(Continued)

OTHER PUBLICATIONS

"IEEE Standard for Adoption of MIPI Alliance Specification for A-PHY Interface (A-PHY) Version 1.0"; Jun. 2021 (Year: 2021).*
(Continued)

*Primary Examiner* — Benjamin H Elliott, IV
(74) *Attorney, Agent, or Firm* — Michael Best & Friedrich LLP

(57) ABSTRACT

Communication with more reliable functional safety is disclosed. In one example, a communication device includes a packet generation unit configured to generate a packet having a packet structure in which a Mobile Industry Processor Interface (MIPI) standard is incorporated in a frame defined by Institute of Electrical and Electronics Engineers (IEEE) 1722 that is a communication standard via a network, and a timer configured to acquire a time stamp stored in a packet header of the packet. The technology can be applied to, for example, a communication system connected with an in-vehicle camera.

16 Claims, 16 Drawing Sheets

(56) References Cited

U.S. PATENT DOCUMENTS

| | | | | |
|---|---|---|---|---|
| 2021/0056058 | A1* | 2/2021 | Lee | G06F 13/4221 |
| 2021/0109881 | A1* | 4/2021 | Moustafa | H04L 1/0041 |
| 2022/0021756 | A1* | 1/2022 | Fuller | H04L 49/109 |
| 2022/0123849 | A1* | 4/2022 | McCall | H04J 3/0658 |
| 2022/0345417 | A1* | 10/2022 | Kasichainula | H04L 47/30 |
| 2023/0047664 | A1* | 2/2023 | Jeong | G01R 31/2889 |
| 2023/0143642 | A1* | 5/2023 | Takahashi | H04L 69/22<br>370/230 |
| 2025/0055722 | A1* | 2/2025 | Hirama | H04L 69/324 |

FOREIGN PATENT DOCUMENTS

| | | | |
|---|---|---|---|
| TW | 202203048 | A | 1/2022 |
| WO | 2020129685 | A1 | 6/2020 |
| WO | WO-2020150872 | A1 | 7/2020 |

OTHER PUBLICATIONS

International Search Report (PCT/ISA/210), International Application No. PCT/JP2023/000720, dated Mar. 28, 2023.

"IEEE Standard for Adoption of MIPI Alliance Specification for A-PHY Interface (A-PHY) version 1.0", IEEE std 2977-2021, IEEE, Piscataway, NJ USA Jun. 24, 2021 (Jun. 24, 2021), pp. 1-205, XP068181602.

* cited by examiner

FIG. 2

| Value | Name | Description |
|---|---|---|
| 00 | ACF_FLEXRAY | FlexRay(tm)message |
| 01 | ACF_CAN | Controll Area Network |
| | | |
| 0B | ACF_ANCILLARY | Video ancillary data message |
| 0C to 77 | Reserved | Reserved |
| 78 to 7F | ACF_USER | |

⇩

| Value | Name | Description |
|---|---|---|
| 00 | ACF_FLEXRAY | FlexRay(tm)message |
| 01 | ACF_CAN | Controll Area Network |
| | | |
| 0B | ACF_ANCILLARY | Video ancillary data message |
| 0C | ACF_MIPI | MIPI message |
| 0D to 77 | Reserved | Reserved |
| 78 to 7F | ACF_USER | |

FIG. 6 acf_msg_type=ACF_MIPI(0C)

acf_msg_length=0~511bytes pad=0-2bytes mtv=message_timestamp valid ud=uplink/downlink ct=controller/target gear=1-5 lane=1-4 pn=PAM/NRZ port_id=0-31

Adaptation Descriptor

Service Descriptor

Placement Descriptor

PHY2

Target Address

PHY3

Payload length

PHY Header CRC

MIPI Payload

PHY Tail CRC-32

Please refer MIPI A-PHY spec ide=id extention

Valid if extended_port_id=(ide=1) is satisfied

A-Packet Format

FIG. 13

A-Packet Fields and Sub-Fields Description

| A-Packet Section | Field | Sub-Field | Size (Bits) | Bits | Description | See Section |
|---|---|---|---|---|---|---|
| A-Header | Adaptation Descriptor | Adaptation Type | 4 | b3:b0 | Type of Native Protocol Adaptation Layer communication with the A-PHY Data Link Layer | 11.2.1.1.1 |
| | | Reserved | 4 | b7:b4 | Reserved for future use | Value:0x0 |
| | Service Descriptor | PHY1 | 2 | b1:b0 | Reserved for PHY Usage | 11.2.1.2.1 |
| | | Prio | 2 | b3:b2 | Indicates the A-Packet's Priority | 11.2.1.2.2 |
| | | QoS | 2 | b5:b4 | Indicates the A-Packet's Quality of Service | 11.2.1.2.3 |
| | | BAD | 1 | b6 | Value 1'b1 indicates a Bad A-Packet | 11.2.1.2.4 |
| | | Reserved | 1 | b7 | Reserved for future use | Value:1'b0 |
| | Placement Descriptor | ALE1 | 3 | b2:b0 | Adaptation Layer specific information | See relevant Adaptation Layer Specification for more details |
| | | OB (Odd-Bytes) | 1 | b3 | Value 1'b1 indicates that the A-Payload contains an odd number of Bytes | 11.2.1.3.2 |
| | | Order | 2 | b5:b4 | Indicates the order of this A-Packet within a stream sequence of A-Packets | 11.2.1.3.3 |
| | | Reserved | 2 | b7:b6 | Reserved for future use | Value:2'b00 |
| | PHY2 | | 8 | b7:b0 | Reserved for PHY Usage | 11.2.1.4 |
| | Target Address | | 8 | b7:b0 | Indicates the A-Packet's Target destination Address | 11.2.1.5 |
| | PHY3 | | 8 | b7:b0 | Reserved for PHY Usage | 11.2.1.6 |
| | Payload Length(N) | | 8 | b7:b0 | Indicates the number N of 16-bit Payload Words(not bytes)contained in the A-Payload | 11.2.1.7 |
| | PHY Header-CRC | | 8 | b7:b0 | Reserved for PHY Usage | 11.2.1.8 |
| A-Payload | Payload | | 8*K | --- | The Native Adaptation Layer's payload A-Payload length is K bytes(not 16-bit words). | 11.2.2 |
| A-Tail | CRC-32 | | 32 | b31:b0 | Reserved for PHY Usage | 11.2.3 |

COMMUNICATION DEVICE, COMMUNICATION METHOD, AND PROGRAM FOR MOBILE INDUSTRY PROCESSOR INTERFACE PACKET GENERATION

TECHNICAL FIELD

The present disclosure relates to a communication device, a communication method, and a program, and more particularly to a communication device, a communication method, and a program capable of achieving more reliable functional safety.

BACKGROUND ART

Conventionally, a protocol compliant with International Organization for Standardization (ISO) 26262, which is a functional safety standard, has been developed toward Level 4 (advanced automated driving) and Level 5 (autonomous driving), which are next-generation automated driving levels. Then, in the Camera Working Group of the Mobile Industry Processor Interface (MIPI) Alliance, the Camera Service Extensions (CSE) standard to which functional safety and security capabilities required for applications such as automated driving are added is being standardized.

Therefore, functional safety from a complementary metal oxide semiconductor (CMOS) image sensor (CIS) to advanced driver-assistance systems (ADAS) or an electronic control unit (ECU) is achieved by the MIPI standard group.

Furthermore, Patent Document 1 proposes an extension of a packet structure that can be used, for example, in connection with an in-vehicle camera while maintaining compatibility with an existing camera serial interface (CSI)-2 standard.

CITATION LIST

Patent Document

Patent Document 1: WO 2020/129685 A

SUMMARY OF THE INVENTION

Problems to be Solved by the Invention

By the way, although functional safety from the CIS to the ADAS or the ECU is achieved as described above, a measure for achieving similar functional safety has not been realized for different communication standards provided ahead of the ADAS or the ECU. For example, in Ethernet provided ahead of the ADAS or the ECU, there is a concern that consistent functional safety is not considered though band management of the network is performed by the Audio Video Bridging/Time-Sensitive Networking (AVB/TSN).

The present disclosure has been made in view of such a situation, and aims to achieve more reliable functional safety.

Solutions to Problems

A communication device according to one aspect of the present disclosure includes a packet generation unit that generates a packet having a packet structure in which a Mobile Industry Processor Interface (MIPI) standard is incorporated in a frame defined by a communication standard via a network.

A communication method or a program according to one aspect of the present disclosure includes generating a packet having a packet structure in which a Mobile Industry Processor Interface (MIPI) standard is incorporated in a frame defined by a communication standard via a network.

In one aspect of the present disclosure, a packet having a packet structure in which the Mobile Industry Processor Interface (MIPI) standard is incorporated in a frame defined by a communication standard via a network is generated.

BRIEF DESCRIPTION OF DRAWINGS

FIG. 2 is a diagram for explaining an example of a method of incorporating an MIPI standard in an Ethernet frame.

FIG. 6 is a diagram for explaining a description set in the 1722 packet.

FIG. 13 is a diagram illustrating an example of A-Packet Format and Sub-Fields Description.

MODE FOR CARRYING OUT THE INVENTION

Hereinafter, a specific embodiment to which the present technology is applied will be described in detail with reference to the drawings.

Configuration Example of Communication System

Figure 1:
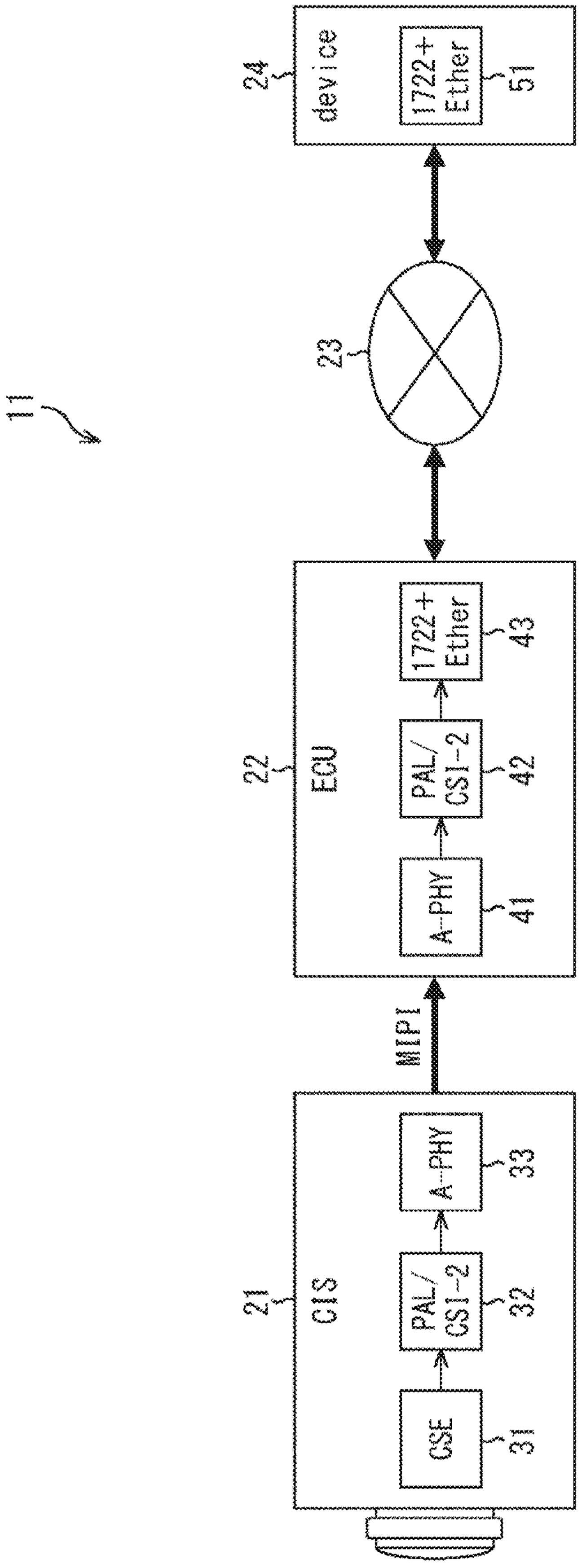
FIG. 1 is a block diagram illustrating a configuration example of an embodiment of a communication system to which the present technology is applied.

FIG. 1 is a block diagram illustrating a configuration example of an embodiment of a communication system to which the present technology is applied.

As illustrated in FIG. 1, a communication system 11 includes a CIS 21 and an ECU 22, and is configured by connecting the ECU 22 and a user device 24 via a network 23. For example, the communication system 11 is configured such that image data acquired by the CIS 21 is transmitted to the ECU 22 in conformity with the MIPI standard, and is transmitted from the ECU 22 to the user device 24 via the network 23. The network 23 is constructed with, for example, a fifth generation mobile communication system or Ethernet including Wi-Fi, a local area network (LAN), and the like, and the ECU 22 and the user device 24 can perform communication on the Ethernet according to Institute of Electrical and Electronics Engineers (IEEE) 1722, which is a communication standard that regulates a packet format and the like of video data and audio data.

The CIS 21 includes a CSE processing unit 31, a transmission circuit 32, and a physical layer interface 33.

The CSE processing unit 31 stores image data outputted from an image sensor (not illustrated) included in the CIS 21 in a payload having a packet structure conforming to the CSE standard, and supplies the payload to the transmission circuit 32.

The transmission circuit 32 performs transmission processing on the image data supplied from the CSE 31 in conformity with the protocol adaptation layer (PAL)/CSI-2 standard, stores the image data in a payload having a packet structure conforming to the PAL/CSI-2 standard, for example, and supplies the image data to the physical layer interface 33.

The physical layer interface 33 is an interface conforming to the A-PHY standard of the MIPI, and can transmit the image data supplied from the transmission circuit 32 to the ECU 22 in a state where functional safety by the MIPI is ensured.

The ECU 22 includes a physical layer interface 41, a reception circuit 42, and a network communication processing unit 43. Note that, although a configuration in which the ECU 22 is provided between the CIS 21 and the network 23 will be described in the present embodiment, an ADAS may be provided between the CIS 21 and the network 23.

Figure 11:
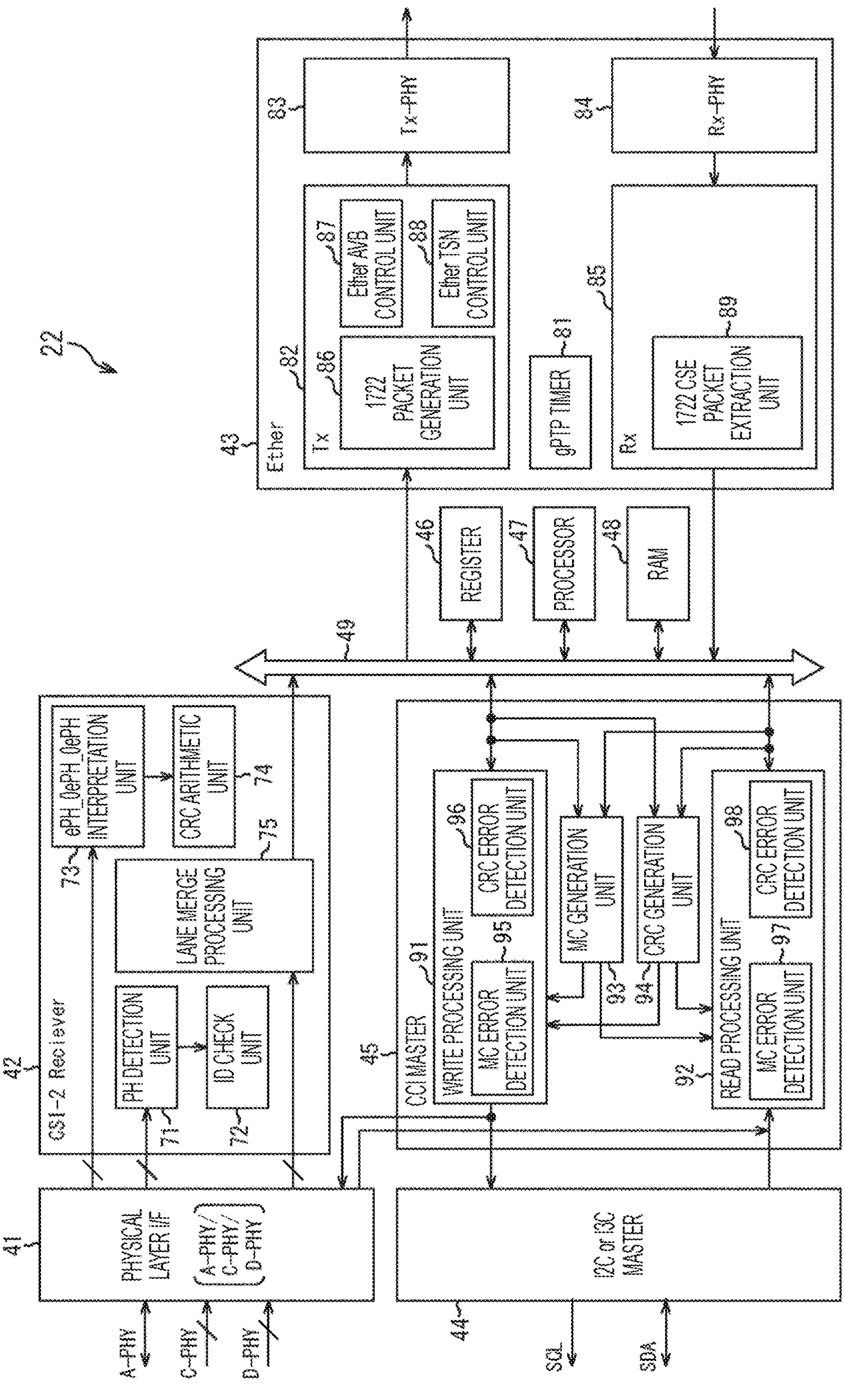
FIG. 11 is a block diagram illustrating a configuration example of an ECU.

Similarly to the physical layer interface 33, the physical layer interface 41 is an interface conforming to the A-PHY standard of the MIPI, receives image data transmitted by the physical layer interface 33, and supplies the image data to the reception circuit 42. Note that, as illustrated in FIG. 11 as described later, the physical layer interface 41 can be switched to any one of A-PHY, C-PHY, and D-PHY, and the same applies to the physical layer interface 33.

The reception circuit 42 performs reception processing based on the packet structure of the image data received by the physical layer interface 41 in conformity with the PAL/CSI-2 standard, and then supplies the image data to the network communication processing unit 43.

The network communication processing unit 43 performs communication processing for performing communication on the Ethernet according to IEEE 1722, and transmits the image data supplied from the reception circuit 42 via the network 23. At this time, for example, the network communication processing unit 43 can generate a packet (which will be hereinafter also referred to as a 1722 packet) having a packet structure in which the MIPI standard (PAL/CSI-2 & CSE) is incorporated in the Ethernet frame defined by IEEE 1722, store the image data in the payload of the 1722 packet, and transmit the image data.

The user device 24 is, for example, a communication terminal such as a smartphone or a tablet, and includes a network communication processing unit 51.

Similarly to the network communication processing unit 43, the network communication processing unit 51 performs communication processing for performing communication on the Ethernet according to IEEE 1722, and acquires image data transmitted by the 1722 packet via the network 23.

The communication system 11 configured as described above can ensure functional safety from the CIS 21 to the ECU 22 by, for example, the CSI-2 packet corresponding to ISO 26262. Then, the communication system 11 can ensure functional safety similar to that of the CSI-2 packet corresponding to ISO 26262 by using the 1722 packet in communication via the network 23. That is, the communication system 11 can extend functional safety ensured by the MIPI standard from the CIS 21 to the ECU 22 to the network 23 provided ahead of the ECU 22, and can achieve more reliable functional safety.

Therefore, the communication system 11 can construct a network that consistently ensures functional safety from a vehicle having an automated driving function via the network 23, for example. Accordingly, it is possible to realize a remote operation of the vehicle from the user device 24 or the like while satisfying functional safety. Furthermore, as described later with reference to FIG. 11, the network communication processing unit 43 can manage the band of the network 23 by the AVB/TSN, and can avoid, for example, loss of important image data due to the band.

The 1722 packet will be described with reference to FIGS. 2 to 6.

Conventionally, as illustrated on the upper side of FIG. 2, 0C to 77 are treated as a reserve in the Ethernet frame defined by IEEE 1722. Then, as illustrated on the lower side of FIG. 2, the MIPI standard is incorporated in the Ethernet frame defined by IEEE 1722 by providing the description MIPI message of the name ACF_MIPI in 0C that is conventionally treated as a reserve.

Figure 3:
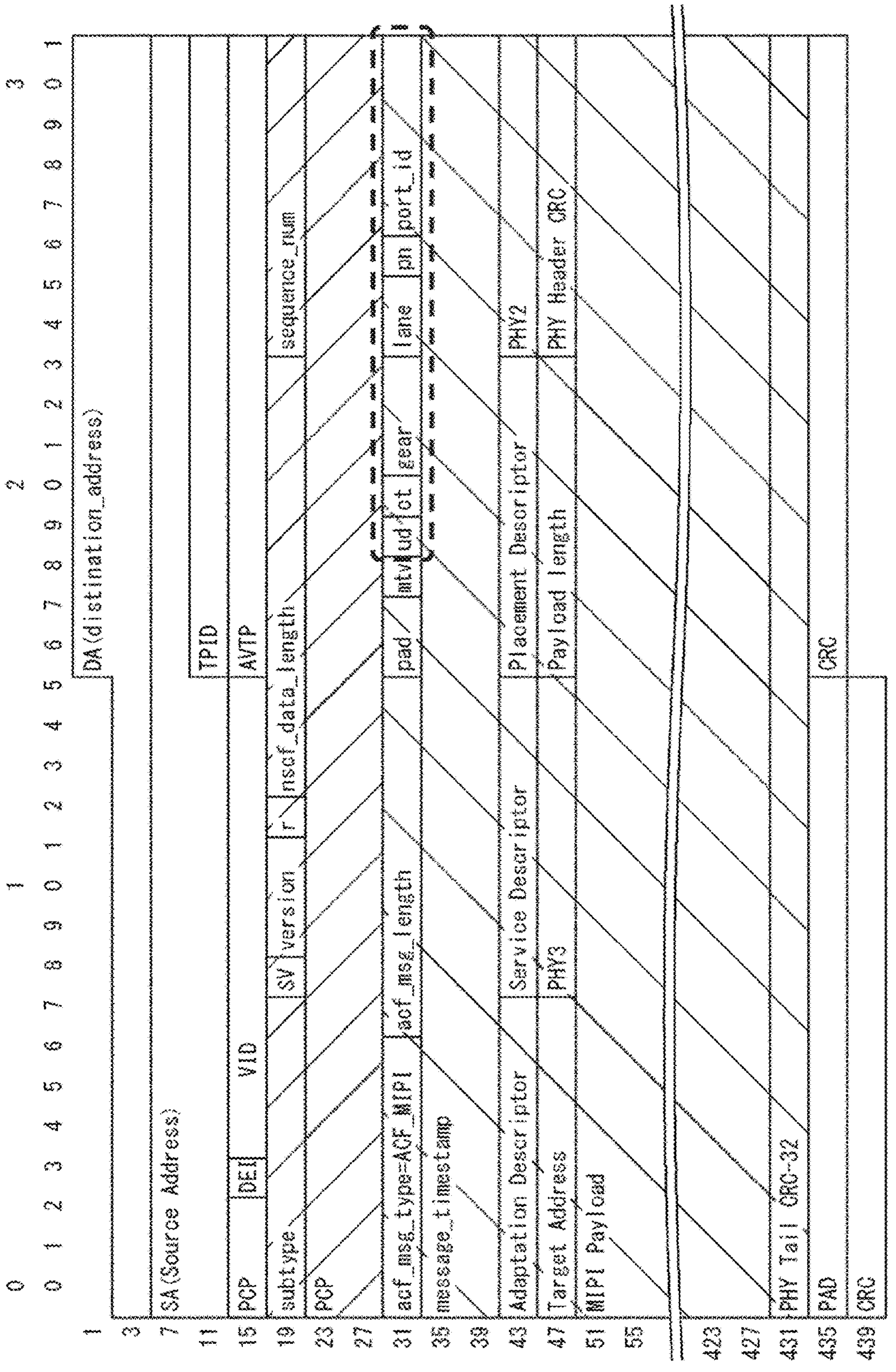
FIG. 3 is a diagram illustrating a first structure example of a packet structure of a 1722 packet.

FIG. 3 illustrates a first structure example of a packet structure of a 1722 packet.

In the packet structure illustrated in FIG. 3, ud, ct, gear, lane, pn, and port_id surrounded by a bold broken line are added to the IEEE 1722 format as information necessary for band reservation in the AVB/TSN.

Figure 4:
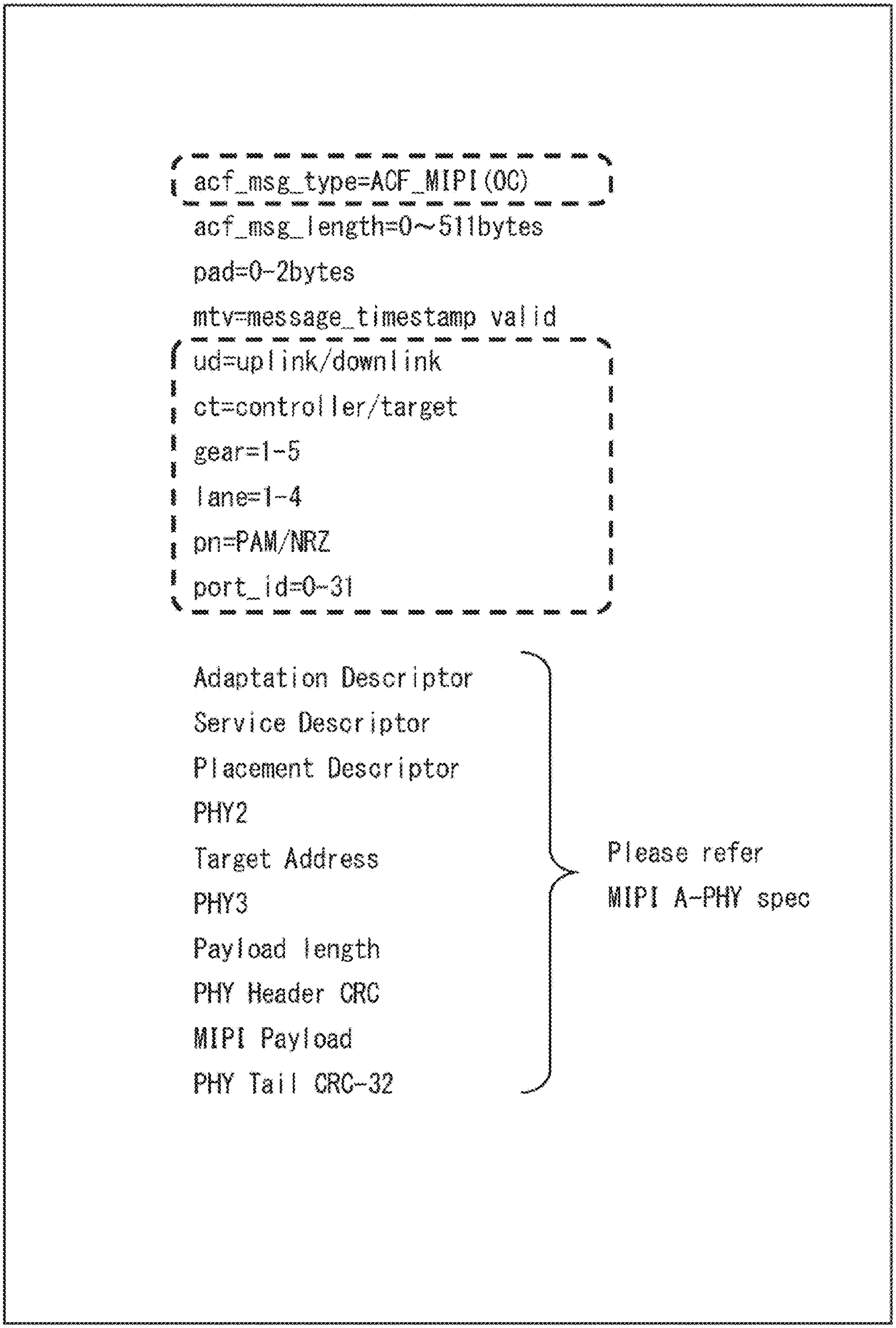
FIG. 4 is a diagram for explaining a description set in the 1722 packet.

For example, as illustrated in FIG. 4, ud indicates one of the uplink and the downlink, and ct indicates one of the controller and the target. The gear indicates any value of 1 to 5, and lane indicates any value of 1 to 4. The pn indicates one of pulse amplitude modulation (PAM) and Non Return to Zero (NRZ) as a modulation method, and port_id indicates any value of 0 to 31 as a port identification (ID).

Furthermore, in the 1722 packet, an adaptation descriptor, a service descriptor, a placement descriptor, PHY2, a target address, PHY3, a payload length, PHY Header CRC, an MIPI payload, and PHY tail CRC-32 are stored with reference to the specification of A-PHY.

For example, in a case where gear representing the speed range of A-PHY indicates 5 and lane representing the number of lanes between the CIS 21 and the ECU 22 indicates 2, it is represented that it is necessary to secure a wide band for transmitting image data.

Figure 5:
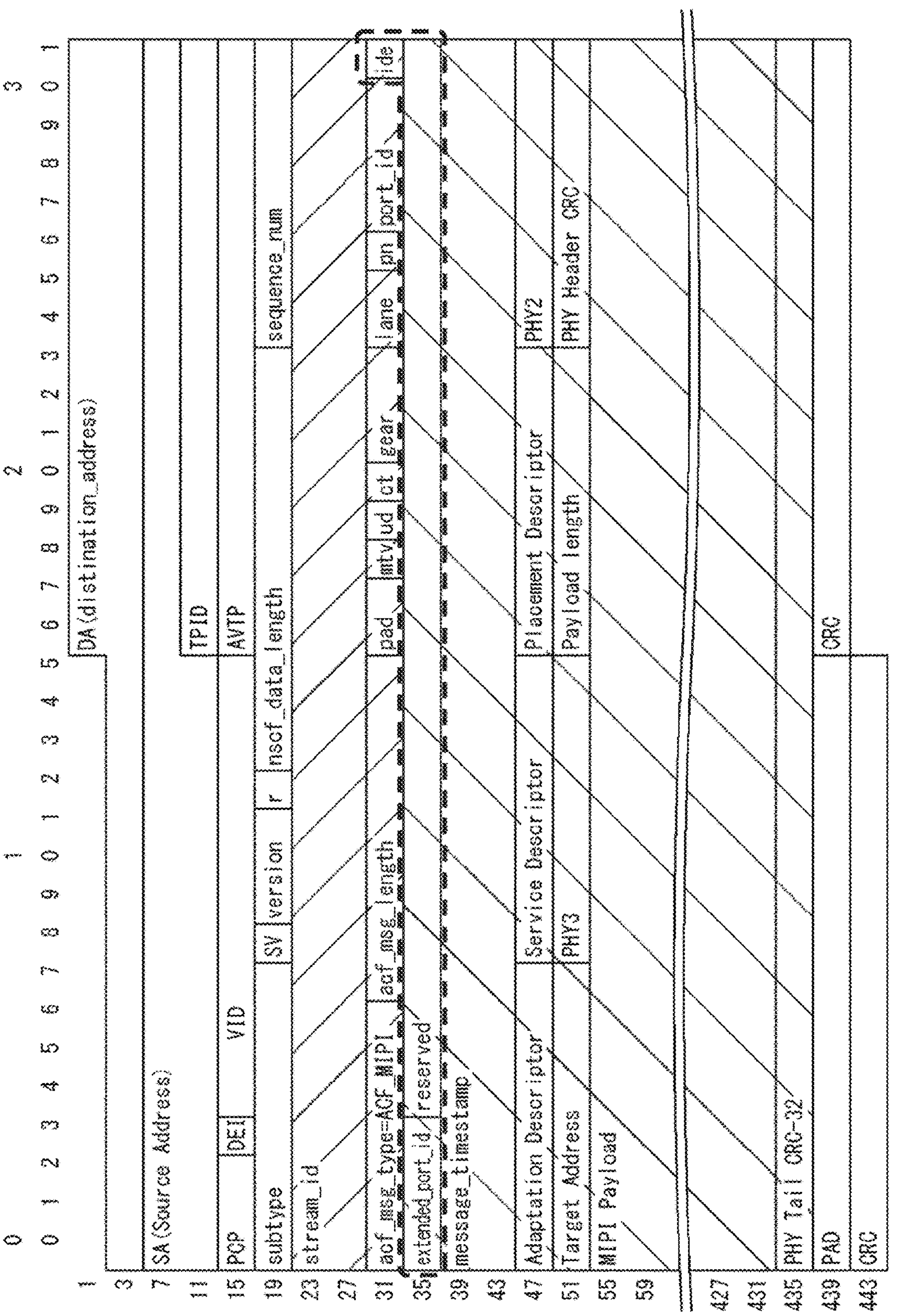
FIG. 5 is a diagram illustrating a second structure example of a packet structure of a 1722 packet.

FIG. 5 illustrates a second structure example of the packet structure of the 1722 packet.

For example, although port_id can indicate any value of 0 to 31 in the packet structure of the 1722 packet illustrated in FIG. 3, it is considered that it is necessary to further extend port_id.

Thus, as illustrated in FIG. 5, ide is added to the IEEE 1722 format in addition to the packet structure illustrated in FIG. 3. For example, as illustrated in FIG. 6, when ide=1 is satisfied, extended_port_id is enabled, and extended_port_id can indicate a value of 32 or more. Furthermore, the reserved provided following extended_port_id is assumed to be used to store additional information when the C-PHY or the D-PHY is used, for example.

Usage Example of Communication System

A usage example in which the communication system 11 in FIG. 1 is applied to a vehicle 12 will be described with reference to FIGS. 7 and 8.

Figure 7:
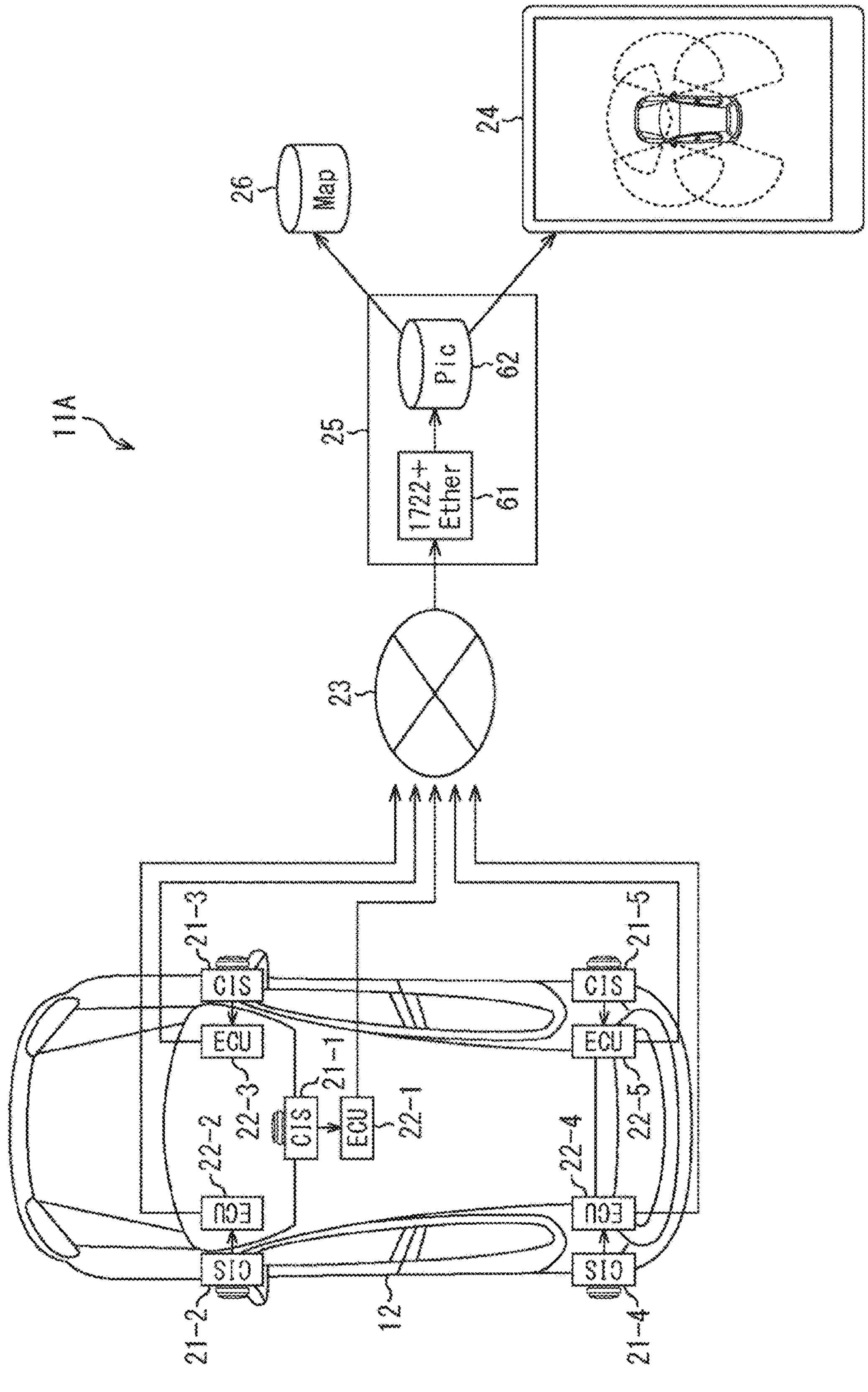
FIG. 7 is a block diagram illustrating a configuration example of a communication system applied to a vehicle.

In a communication system 11A illustrated in FIG. 7, five CISs 21-1 to 21-5 are arranged in the vehicle 12, and are connected with the network 23 respectively via ECUs 22-1 to 22-5. Furthermore, a server 25 is connected with the network 23.

The server 25 includes a network communication processing unit 61 and an image database 62, and the network communication processing unit 61 receives a 1722 packet transmitted from the ECUs 22-1 to 22-5 via the network 23, acquires image data, and stores the image data in the image database 62.

For example, the image data stored in the image database 62 is transmitted to the user device 24, and periphery images of the vehicle 12 captured by the CISs 21-1 to 21-5 are displayed on the user device 24. Furthermore, the image data stored in the image database 62 is transmitted to a map database 26, and map data is created using images (still images or moving images) captured by the CISs 21-1 to 21-5.

At this time, in the communication system 11A, pieces of image data acquired at the same timing in the respective CISs 21-1 to 21-5 are added with a time stamp in (the network communication processing unit 43 of) the ECUs 22-1 to 22-5, and are transmitted to the network 23. For example, the respective pieces of image data may have different transmission times due to restrictions on wiring in the vehicle 12 or may be transmitted at different transmission timings due to variations in transmission time in the network 23. Therefore, it is assumed that the server 25 may receive pieces of image data acquired at the same timing at different timings.

Even in such a case, by referring to the time stamp added to the image data, the communication system 11A can synchronize the pieces of image data acquired at the same timing in the server 25 without depending on the transmission timing. That is, in the image database 62 of the server 25, the database is constructed such that the pieces of image data acquired at the same timing in the five CISs 21-1 to 21-5 are synchronized, and images (still images or moving images) can be stored for a certain period of time.

Therefore, the user device 24 can display the image data acquired by the five CISs 21-1 to 21-5 and synchronized with each other in real time. Furthermore, the map database 26 can create highly accurate map data from the pieces of image data acquired by the five CISs 21-1 to 21-5 and synchronized with each other.

Figure 8:
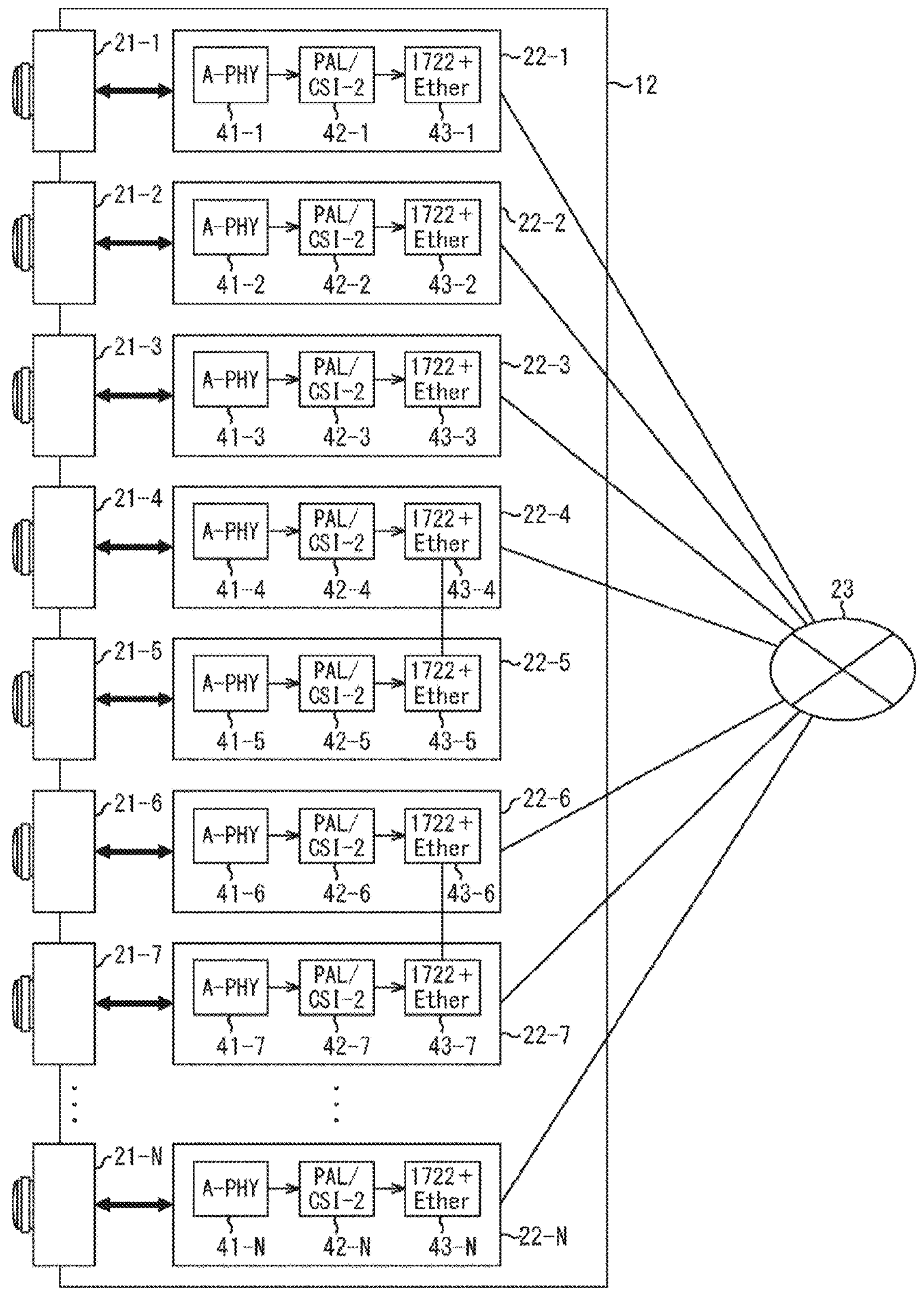
FIG. 8 is a diagram for explaining a configuration of connection with a network.

Furthermore, as illustrated in FIG. 8, various structures can be adopted for a configuration of connection of the CIS 21 and the ECU 22 with the network 23. FIG. 8 illustrates a configuration example in which N ECUs 22-1 to 22-N are provided in the vehicle 12.

For example, the ECU 22-1, the ECU 22-2, and the ECU 22-3 are connected with the network 23 in a star structure in which the ECU 22-2 and the ECU 22-3 are connected with the network 23 on a one-to-one basis. Furthermore, the ECU 22-4 and the ECU 22-5 are connected with the network 23 in a daisy chain structure in which the network communication processing unit 43-5 is connected with the network communication processing unit 43-4 and only the ECU 22-4 is connected with the network 23. Furthermore, the ECU 22-6 and the ECU 22-7 are connected with the network 23 in a ring structure in which the network communication processing unit 43-6 and the network communication processing unit 43-7 are connected and both the ECU 22-6 and the ECU 22-7 are connected with the network 23.

<Packet Structure>

A packet structure of a packet used in the communication system 11 will be described with reference to FIGS. 9 and 10.

Figure 9:
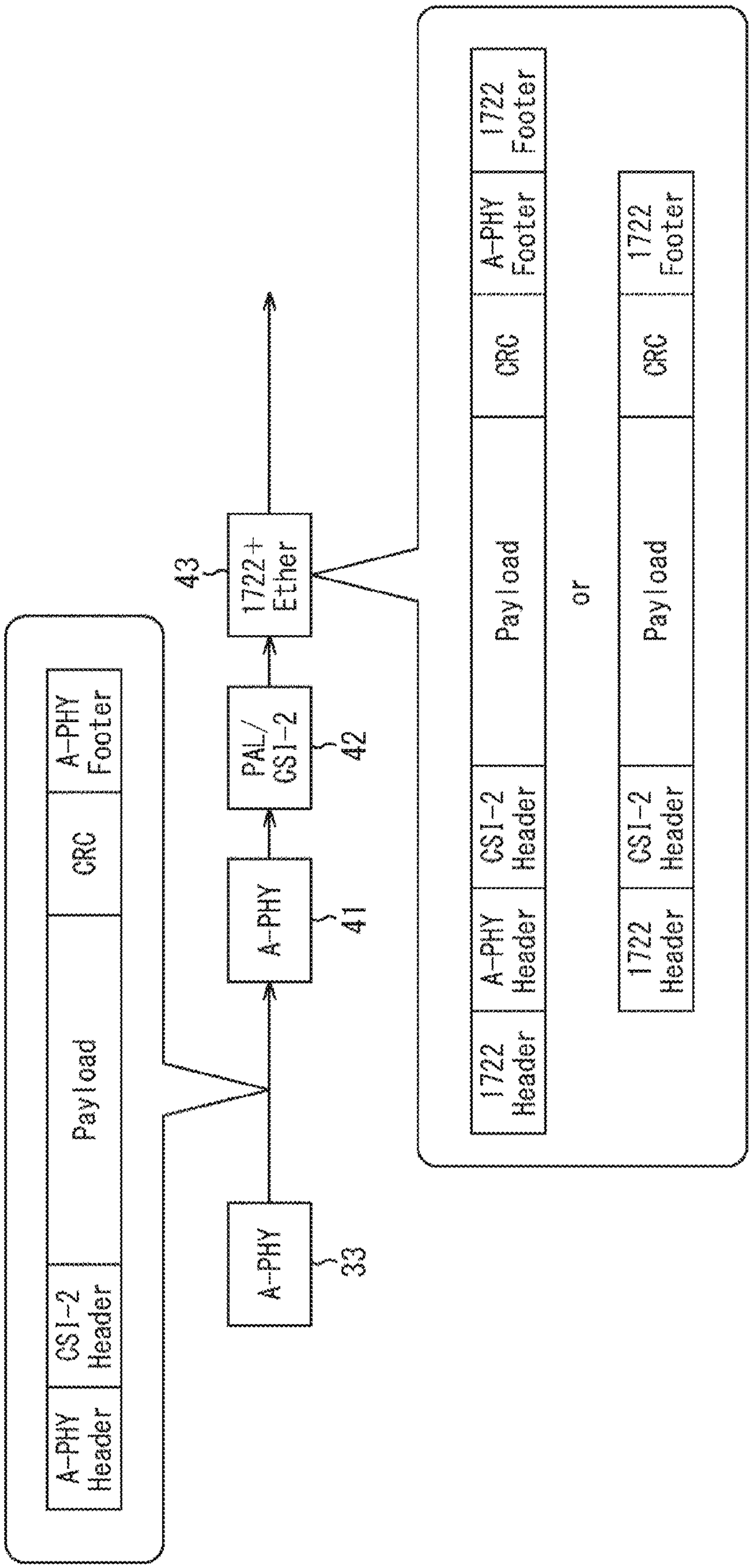
FIG. 9 is a diagram for explaining a packet structure.

As illustrated in FIG. 9, a packet transmitted from the physical layer interface 33 of the CIS 21 to the physical layer interface 41 of the ECU 22 has a packet structure including an A-PHY header, a CSI-2 header, a payload, CRC, and an A-PHY footer. Furthermore, a packet transmitted from the reception circuit 42 to the network communication processing unit 43 inside the ECU 22 has a similar packet structure.

The network communication processing unit 43 can determine whether or not to leave information related to A-PHY depending on whether the A-PHY format is required ahead of the network 23 or not. For example, in a case where the A-PHY format is required ahead of the network 23, the network communication processing unit 43 generates a packet having a packet structure including a 1722 header, an A-PHY header, a CSI-2 header, a payload, CRC, an A-PHY footer, and a 1722 footer. On the other hand, in a case where the A-PHY format is not required ahead of the network 23, the network communication processing unit 43 generates a packet having a packet structure including a 1722 header, a CSI-2 header, a payload, CRC, and a 1722 footer. Here, the 1722 header is a header of a 1722 packet, and the 1722 footer is a footer of a 1722 packet.

Figure 10:
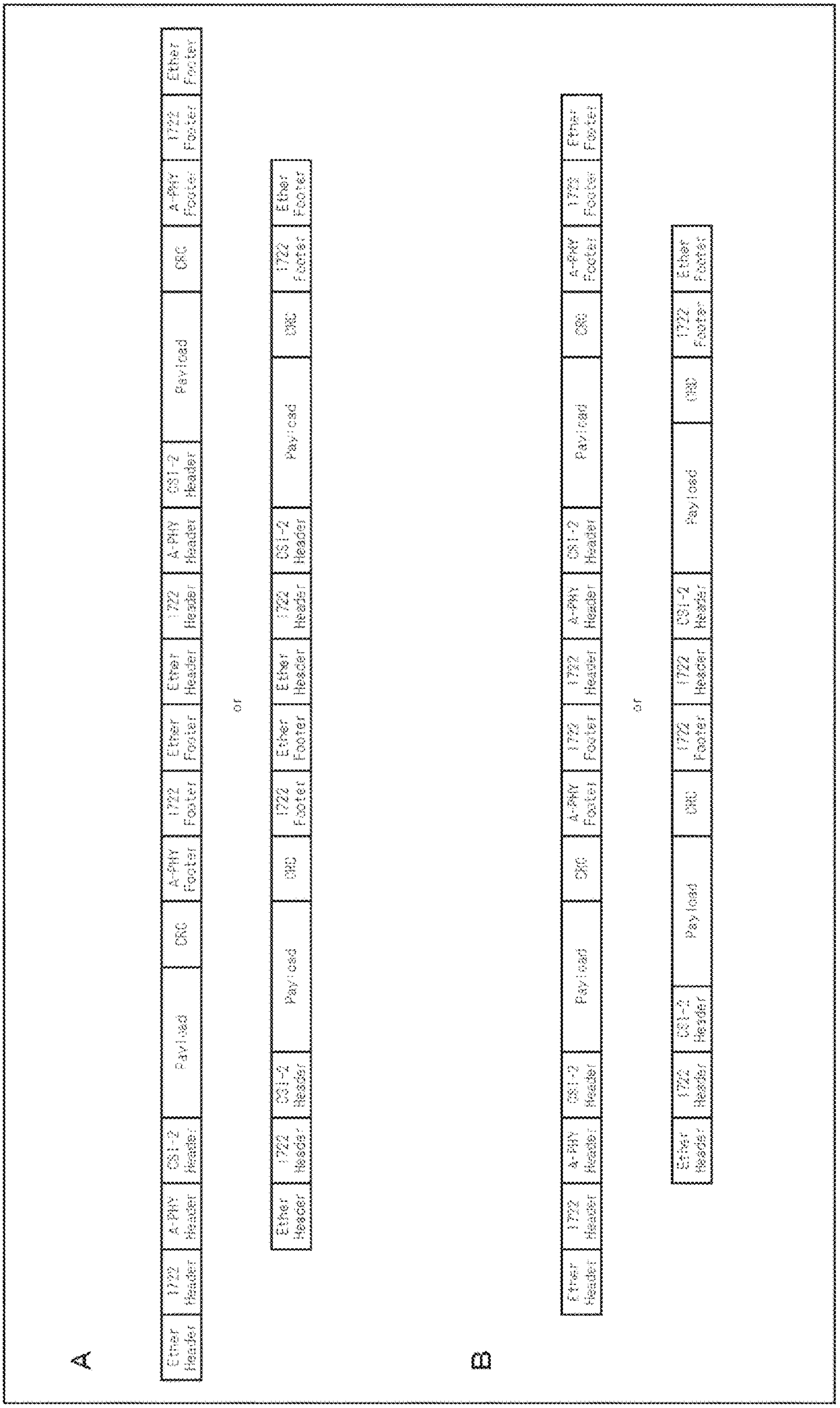
FIG. 10 is a diagram for explaining a packet structure.

FIG. 10 is a diagram illustrating a packet structure of a 1722 packet transmitted from the ECU 22-4 in the daisy chain structure illustrated in FIG. 8. For example, the network communication processing unit 43-4 of the ECU 22-4 transmits image data acquired by the CIS 21-5 and supplied from the network communication processing unit 43-5 of the ECU 22-5 to the network 23 together with the image data acquired by the CIS 21-4.

A of FIG. 10 illustrates a packet structure in which an Ether header and an Ether footer are individually provided for a plurality of pieces of image data.

For example, in a case where the A-PHY format is required ahead of the network 23, the network communication processing unit 43-4 generates a packet having a packet structure including an Ether header, a 1722 header, an A-PHY header, a CSI-2 header, a payload (e.g., image data of the CIS 21-4), CRC, an A-PHY footer, a 1722 footer, an Ether footer, an Ether header, a 1722 header, an A-PHY header, a CSI-2 header, a payload (e.g., image data of the CIS 21-5), CRC, an A-PHY footer, a 1722 footer, and an Ether footer. On the other hand, in a case where the A-PHY format is not required ahead of the network 23, the network communication processing unit 43-4 generates a packet having a packet structure including an Ether header, a 1722 header, a CSI-2 header, a payload (e.g., image data of the CIS 21-4), CRC, a 1722 footer, an Ether footer, an Ether header, a 1722 header, a CSI-2 header, a payload (e.g., image data of the CIS 21-5), CRC, a 1722 footer, and an Ether footer.

B of FIG. 10 illustrates a packet structure in which an Ether header and an Ether footer are provided so as to be shared by a plurality of pieces of image data.

For example, in a case where the A-PHY format is required ahead of the network 23, the network communication processing unit 43-4 generates a packet having a packet structure including an Ether header, a 1722 header, an A-PHY header, a CSI-2 header, a payload (e.g., image data of the CIS 21-4), CRC, an A-PHY footer, a 1722 footer, a 1722 header, an A-PHY header, a CSI-2 header, a payload (e.g., image data of the CIS 21-5), CRC, an A-PHY footer, a 1722 footer, and an Ether footer. On the other hand, in a case where the A-PHY format is not required ahead of the network 23, the network communication processing unit 43-4 generates a packet having a packet structure including an Ether header, a 1722 header, a CSI-2 header, a payload (e.g., image data of the CIS 21-4), CRC, a 1722 footer, a 1722 header, a CSI-2 header, a payload (e.g., image data of the CIS 21-5), CRC, a 1722 footer, and an Ether footer.

As described above, in a case where a plurality of pieces of image data is concatenated, it is practically impossible to set the time stamps added to the respective pieces of image data to completely the same timing. On the other hand, focusing on the point that the timings are substantially the same, a plurality of pieces of image data can be sequentially concatenated by the ECU 22 in order from image data corresponding to an earlier time stamp. For example, reduction of the bit depth can be achieved by using all the information as the time stamp of the first image data, using only a differential value from the time stamp of the first image data as the time stamp of the second image data, using only a differential value from the time stamp of the second image data as the time stamp of the third image data, and so forth.

Configuration Example of ECU

FIG. 11 is a block diagram illustrating a configuration example of the ECU 22.

As illustrated in FIG. 11, the ECU 22 includes an I2C or I3C master 44, a camera controller interface (CCI) master 45, a register 46, a processor 47, and a random access memory (RAM) 48 in addition to the physical layer interface 41, the reception circuit 42, and the network communication processing unit 43. Furthermore, the reception circuit 42, the network communication processing unit 43, the CCI master 45, the register 46, the processor 47, and the RAM 48 are connected with each other via a bus 49.

The physical layer interface 41 can be switched to any of A-PHY, C-PHY, and D-PHY, and communicates with the physical layer interface 33 on the CIS 21 side in conformity to each standard.

The reception circuit 42 includes a packet header detection unit 71, an ID check unit 72, an interpretation unit 73, a CRC arithmetic unit 74, and a lane merge processing unit 75.

The packet header detection unit 71 detects a packet header from a packet supplied via the physical layer interface 41, performs processing according to various types of setting information stored in the packet header, and supplies the packet header to the ID check unit 72.

The ID check unit 72 checks the packet ID included in the packet header supplied from the packet header detection unit 71 and manages the packet ID.

The interpretation unit 73 interprets the setting information stored in the extension payload header ePH, the optional extension payload header OePH, and the optional extension payload footer OePF included in the packet supplied via the physical layer interface 41, and performs processing according to each setting information.

The CRC arithmetic unit 74 computes CRC of the packet supplied via the interpretation unit 73, and outputs a CRC error detection signal in a case where a CRC error is detected.

The lane merge processing unit 75 merges a packet divided into four lanes and supplied from the physical layer interface 41, and outputs the packet in one lane. Then, the packet outputted from the lane merge processing unit 75 is supplied to the network communication processing unit 43 via the bus 49.

The network communication processing unit 43 includes a gPTP timer 81, a transmission processing unit 82, a transmission physical layer 83, a reception physical layer 84, and a reception processing unit 85. Furthermore, the transmission processing unit 82 has a 1722 packet generation unit 86, an Ether AVB control unit 87, and an Ether TSN control unit 88, and the reception processing unit 85 has a 1722 CSE packet extraction unit 89.

The gPTP timer 81 acquires a time stamp added to the 1722 packet generated by the 1722 packet generation unit 86 according to a generic precision time protocol (gPTP), which is a communication protocol used to synchronize clocks in the entire communication system 11, and supplies the time stamp to the 1722 packet generation unit 86.

In the transmission processing unit 82, the 1722 packet generation unit 86 generates a 1722 packet from the packet supplied from the reception circuit 42 via the bus 49, and the Ether AVB control unit 87 and the Ether TSN control unit 88 perform band reservation of the network. That is, the 1722 packet generation unit 86 generates a 1722 packet having a packet structure in which the MIPI standard is incorporated in the frame defined by IEEE 1722. Then, the Ether AVB control unit 87 and the Ether TSN control unit 88 store setting information necessary for band reservation in the network 23 in the packet header of the 1722 packet.

Figure 12:
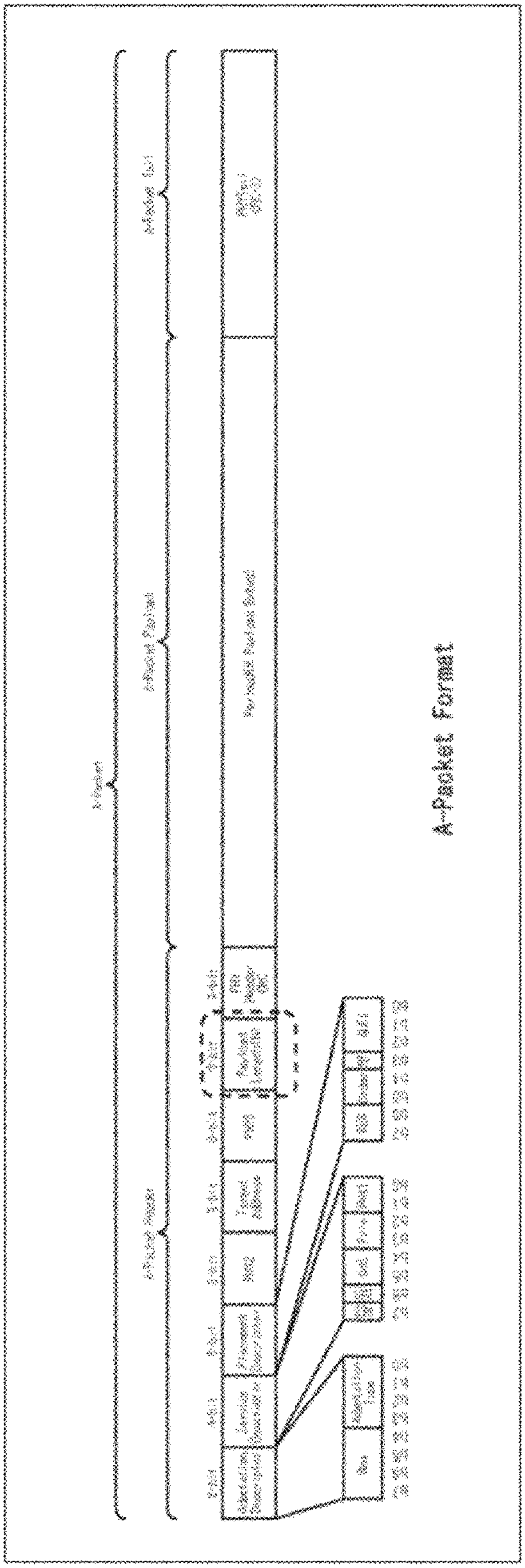
FIG. 12 is a diagram illustrating an example of A-Packet Format.

Here, the packet (A-Packet) conforming to the A-PHY standard supplied to the 1722 packet generation unit 86 has a packet structure illustrated in FIG. 12. An 8-bit payload length (N) stored in the header of the A-Packet is a description illustrated in FIG. 13, and the 1722 packet generation unit 86 can set acf_msg_length (=0 to 511 bytes) of the 1722 header according to the payload length (N) and set pad (=0 to 2 bytes) by fraction calculation.

Furthermore, the 1722 packet generation unit 86 performs initial setting for acf_msg_type=ACF_MIPI(0C) and mtv=message_timestamp valid, and sets a time stamp supplied from the gPTP timer 81 for message_timestamp. Moreover, the 1722 packet generation unit 86 may set uplink (=0) or downlink (=1) to ud on the basis of the bus address of the bus 49. Furthermore, the 1722 packet generation unit 86 can acquire and set information at the time of receiving the A-Packet for ct (0=Controller/1=Target), gear (=1 to 5), lane (=1 to 4), and pn (0=PAM/1=NRZ).

The transmission physical layer 83 transmits the 1722 packet supplied from the 1722 packet generation unit 86 to the network 23.

The reception physical layer 84 receives a packet transmitted from the network 23 and supplies the packet to the reception processing unit 85.

In the reception processing unit 85, the 1722 CSE packet extraction unit 89 extracts the 1722 CSE packet from the packet supplied from the reception physical layer 84 and outputs the 1722 CSE packet to the bus 49.

The I2C or I3C master 44 leads communication using the clock signal SCL and the data signal SDA with an I2C or I3C slave (not illustrated) on the CIS 21 side in conformity with a communication standard of I2C (inter-integrated circuit) or I3C (improved inter integrated circuits).

The CCI master 45 leads communication with a CCI slave (not illustrated) on the CIS 21 side in conformity with the CSI-2 standard. The CCI master 45 includes a write processing unit 91, a read processing unit 92, an MC generation unit 93, and a CRC generation unit 94. Furthermore, the write processing unit 91 has an MC error detection unit 95 and a CRC error detection unit 96, and the read processing unit 92 has an MC error detection unit 97 and a CRC error detection unit 98.

In the write processing unit 91, the MC error detection unit 95 outputs Slave Side MC err (M) when detecting an MC error on the CCI slave side (NACK detection during MC_M transmission), and the CRC error detection unit 96 outputs Slave Side CRC err (M) when detecting a CRC error on the CCI slave side (NACK detection during MC_CRC transmission). Here, the Slave Side MC err (M) is an MC error on the CCI slave side detected on the CCI master 45 side, and the Slave Side CRC err (M) is a CRC error on the CCI slave side detected on the CCI master 45 side.

In the read processing unit 92, the MC error detection unit 97 outputs Master Side MC err when detecting an MC error (an error based on comparison between MC generated by the CCI master 45 and MC received by the CCI master 45) on the CCI master 45 side, and the CRC error detection unit 98 outputs Master Side CRC err when detecting an MC error (an error based on comparison between CRC generated by the CCI master 45 and CRC received by the CCI master 45) on the CCI master 45 side.

The MC generation unit 93 generates an MC on the CCI master 45 side and supplies the MC to the write processing unit 91 and the read processing unit 92.

The CRC generation unit 94 generates a CRC on the CCI master 45 side and supplies the CRC to the write processing unit 91 and the read processing unit 92.

The register 46 stores various setting values and the like set for the ECU 22. The processor 47 executes a program for controlling each unit of the ECU 22 according to the setting value stored in the register 46. The RAM 48 stores data required when the processor 47 executes a program.

Packet generation processing of generating a 1722 packet will be described with reference to FIGS. 14 and 15.

Figure 14:
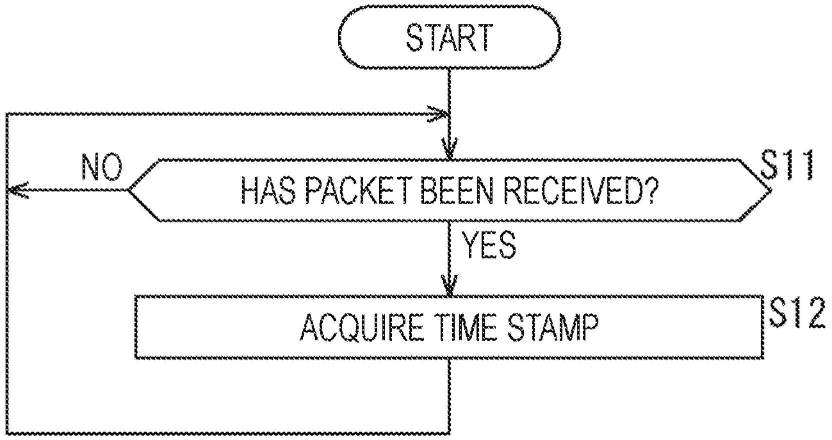
FIG. 14 is a flowchart for explaining processing performed in a gPTP timer.

FIG. 14 is a flowchart for explaining processing performed in the gPTP timer 81.

In step S11, the gPTP timer 81 determines whether the network communication processing unit 43 has received a packet supplied from the reception circuit 42 or not, and waits for the processing until it is determined that a packet has been received.

Then, when it is determined in step S11 that a packet has been received, the processing proceeds to step S12, and the gPTP timer 81 acquires a value according to gPTP at the timing when the packet is received as a time stamp. Then, after the gPTP timer 81 supplies the acquired time stamp to the 1722 packet generation unit 86, the processing returns to step S11, and similar processing is repeatedly performed subsequently.

Figure 15:
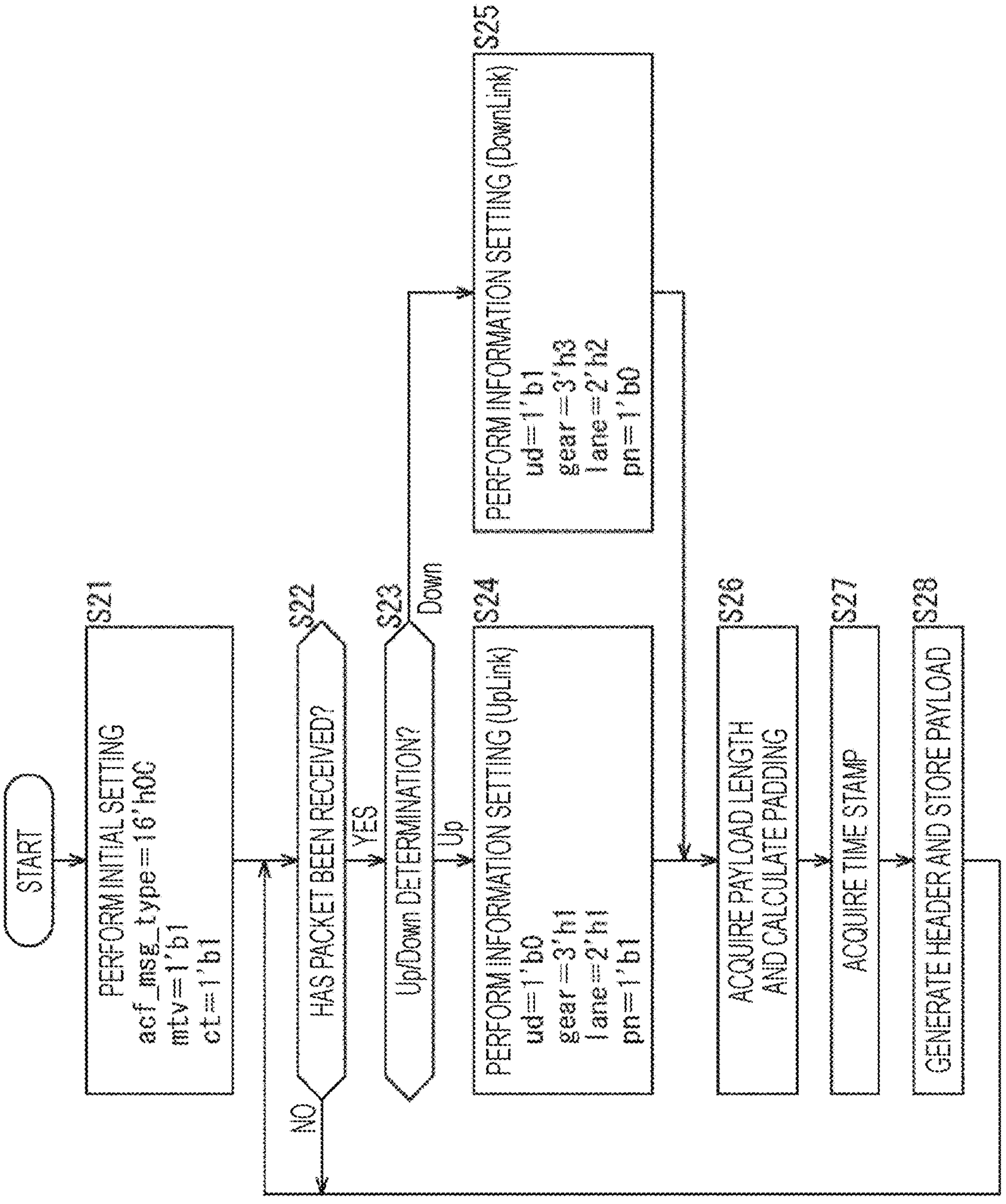
FIG. 15 is a flowchart for explaining processing performed in a 1722 packet generation unit.

FIG. 15 is a flowchart for explaining processing performed in the 1722 packet generation unit 86.

In step S21, the 1722 packet generation unit 86 performs initial setting (e.g., acf_msg_type=16'h0C, mtv=1'b1, and ct=1'b1) for generating the 1722 packet.

In step S22, the 1722 packet generation unit 86 determines whether the network communication processing unit 43 has received a packet supplied from the reception circuit 42 or not, and waits for the processing until it is determined that a packet has been received.

Then, when it is determined in step S22 that a packet has been received, the processing proceeds to step S23, and the 1722 packet generation unit 86 determines uplink or downlink on the basis of the bus address of the bus 49.

In a case where it is determined in step S23 that it is uplink, the processing proceeds to step S24, and the 1722 packet generation unit 86 performs information setting for uplink (e.g., ud=1'b0, gear=3'h1, lane=2'h1, and pn=1'b1) on the packet header of the 1722 packet.

On the other hand, in a case where it is determined in step S23 that it is downlink, the processing proceeds to step S25, and the 1722 packet generation unit 86 performs information setting for downlink (e.g., ud=1'b1, gear=3'h3, lane=2'h2, and pn=1'b0) on the packet header of the 1722 packet.

After the processing of step S24 or S25, the processing proceeds to step S26, and the 1722 packet generation unit 86 acquires the payload length and calculates the padding, as described above with reference to FIGS. 12 and 13.

In step S27, the 1722 packet generation unit 86 acquires the time stamp supplied from the gPTP timer 81 in step S12 in FIG. 14.

In step S28, the 1722 packet generation unit 86 generates the packet header of the 1722 packet storing the time stamp acquired in step S27, and generates the 1722 packet storing the image data of the received packet in the payload. Thereafter, the processing returns to step S22, and similar processing is repeated subsequently.

With above processing, it is possible to generate the 1722 packet, manage the band of the network 23 by AVB/TSN by performing information setting in the packet header of the 1722 packet, and achieve synchronization of the image data by storing a time stamp in the packet header of the 1722 packet.

Configuration Example of Computer

Figure 16:
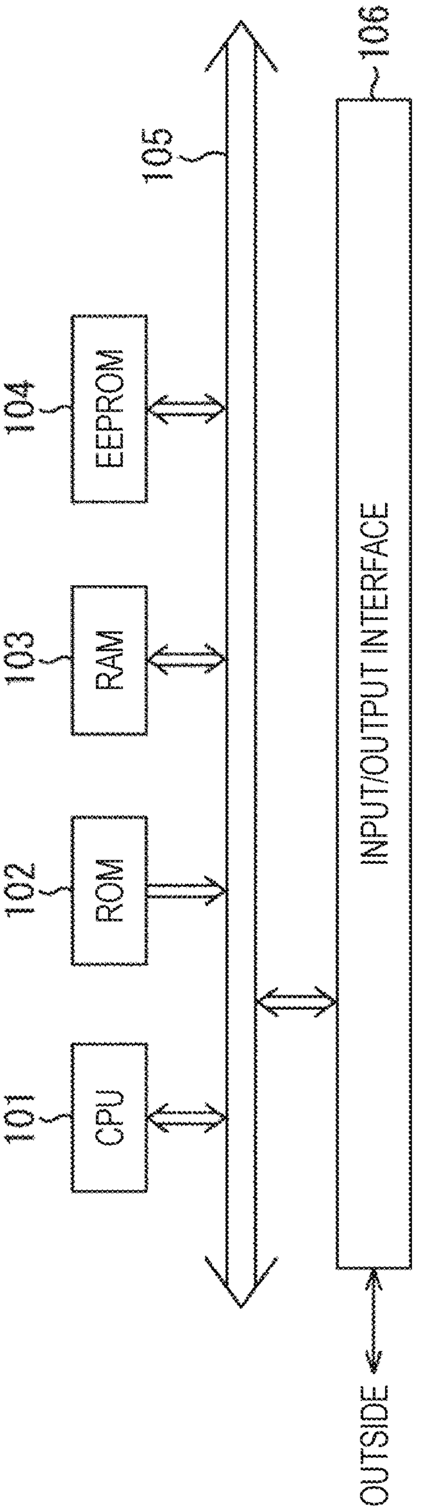
FIG. 16 is a block diagram illustrating a configuration example of an embodiment of a computer to which the present technology is applied.

FIG. 16 is a block diagram illustrating a configuration example of hardware of a computer that executes the above-described series of processing by a program.

In the computer, a central processing unit (CPU) 101, a read only memory (ROM) 102, a random access memory (RAM) 103, and an electronically erasable and programmable read only memory (EEPROM) 104 are connected with each other by a bus 105. The bus 105 is further connected with an input/output interface 106, and the input/output interface 106 is connected with the outside.

In the computer configured as described above, for example, the CPU 101 loads a program stored in the ROM 102 and the EEPROM 104 into the RAM 103 via the bus 105 and executes the program, whereby the above-described series of processing is performed. Furthermore, the program executed by the computer (CPU 101) can be written in advance in the ROM 102, or can be installed or updated in the EEPROM 104 from the outside via the input/output interface 106.

Combination Examples of Configurations

Note that the present technology can also have the following configurations.

(1)

A communication device including a packet generation unit configured to generate a packet having a packet structure in which a Mobile Industry Processor Interface (MIPI) standard is incorporated in a frame defined by a communication standard via a network.

(2)

The communication device according to (1) described above, further including a timer configured to acquire a time stamp stored in a packet header of the packet generated in the packet generation unit.

(3)

The communication device according to (2) described above, in which a plurality of pieces of data are concatenated in order from a time corresponding to an earlier time stamp and a differential value from a time stamp of previous data is used as a time stamp of the second and subsequent pieces of data in a case where the plurality of pieces of data is stored between a packet header and a packet footer of the packet.

(4)

The communication device according to any one of (1) to (3) described above, in which setting information necessary for band reservation in the network is stored in the packet header.

(5)

The communication device according to (4) described above, further including an audio video bridging (AVB) control unit configured to perform band management of the network by AVB on the basis of the setting information.

(6)

The communication device according to (4) or (5), further including a time-sensitive networking (TSN) control unit configured to perform band management of the network by TSN on the basis of the setting information.

(7)

The communication device according to any one of (1) to (6) described above, in which setting information indicating uplink or downlink is stored in the packet header.

(8)

The communication device according to any one of (1) to (7) described above, in which setting information indicating a controller or a target is stored in the packet header.

(9)

The communication device according to any one of (1) to (8) described above, in which setting information indicating a speed range of the MIPI in A-PHY is stored in the packet header.

(10)

The communication device according to any one of (1) to (9) described above, in which setting information indicating the number of lanes of the MIPI in A-PHY is stored in the packet header.

(11)

The communication device according to any one of (1) to (10) described above, in which setting information indicating a modulation method is stored in the packet header.

(12)

The communication device according to any one of (1) to (11) described above, in which setting information indicating a port identification (ID) is stored in the packet header.

(13)

The communication device according to any one of (1) to (12) described above, in which a communication standard via the network is Institute of Electrical and Electronics Engineers (IEEE) 1722.

(14)

A communication method including generating, by a communication device, a packet having a packet structure in which a Mobile Industry Processor Interface (MIPI) standard is incorporated in a frame defined by a communication standard via a network.

(15)

A program for causing a computer of a communication device to execute communication processing including generating a packet having a packet structure in which a Mobile Industry Processor Interface (MIPI) standard is incorporated in a frame defined by a communication standard via a network.

Note that the present embodiment is not limited to the above-described embodiment, and various modifications can be made without departing from the gist of the present disclosure. Furthermore, the effects described herein are merely examples and are not limited, and other effects may be provided.

REFERENCE SIGNS LIST

11 Communication system
12 Vehicle
21 CIS
22 ECU
23 Network
24 User device
25 Server
26 Map database
31 CSE processing unit
32 Transmission circuit
33 Physical layer interface
41 Physical layer interface
42 Reception circuit
43 Network communication processing unit
44 I2C or I3C master
45 CCI master
46 Register
47 Processor
48 RAM
49 Bus
51 Network communication processing unit
61 Network communication processing unit
62 Image database
81 gPTP timer
86 1722 packet generation unit
87 Ether AVB control unit
88 Ether TSN control unit
89 1722 CSE packet extraction unit

The invention claimed is:

1. A communication device comprising:

a memory storing a program, and at least one processor configured to execute the program to perform operations comprising:

generating a packet having a packet structure in which a mobile industry processor interface (MIPI) standard is incorporated in a frame defined by a communication standard via a network, wherein setting information indicating a speed range of the MIPI in A-PHY is stored in a packet header of the packet.

2. The communication device according to claim 1, wherein the operations further comprise:

acquiring, from a timer, a time stamp stored in a packet header of the generated packet.

3. The communication device according to claim 2, wherein a plurality of pieces of data are concatenated in order from a time corresponding to an earlier time stamp and a differential value from a time stamp of previous data is used as a time stamp of second and subsequent pieces of data in a case where the plurality of pieces of data is stored between a packet header and a packet footer of the packet.

4. The communication device according to claim 1, wherein setting information necessary for band reservation in the network is stored in the packet header of the packet.

5. The communication device according to claim 4, further comprising an audio video bridging (AVB) control unit configured to perform band management of the network by AVB on a basis of the setting information.

6. The communication device according to claim 4, further comprising a time-sensitive networking (TSN) control unit configured to perform band management of the network by TSN on a basis of the setting information.

7. The communication device according to claim 1, wherein setting information indicating uplink or downlink is stored in a packet header of the packet.

8. The communication device according to claim 1, wherein setting information indicating a controller or a target is stored in a packet header of the packet.

9. A communication device comprising:

a memory storing a program, and at least one processor configured to execute the program to perform operations comprising:

generating a packet having a packet structure in which a mobile industry processor interface (MIPI) standard is incorporated in a frame defined by a communication standard via a network, wherein setting information indicating a number of lanes of the MIPI in A-PHY is stored in a packet header of the packet.

10. The communication device according to claim 1, wherein setting information indicating a modulation method is stored in a packet header of the packet.

11. The communication device according to claim 1, wherein setting information indicating a port identification (ID) is stored in a packet header of the packet.

12. The communication device according to claim 1, wherein a communication standard via the network is Institute of Electrical and Electronics Engineers (IEEE) 1722.

13. A communication method comprising:

generating, by a communication device, a packet having a packet structure in which a Mobile Industry Processor Interface (MIPI) standard is incorporated in a frame defined by a communication standard via a network, wherein setting information indicating a speed range of the MIPI in A-PHY is stored in a packet header of the packet.

14. A non-transitory computer readable medium storing a program for causing communication device to execute communication processing-including, the program being executable by a processor to perform operations comprising:

generating a packet having a packet structure in which a Mobile Industry Processor Interface (MIPI) standard is incorporated in a frame defined by a communication standard via a network, wherein setting information indicating a speed range of the MIPI in A-PHY is stored in a packet header of the packet.

15. A communication method comprising:

generating a packet having a packet structure in which a mobile industry processor interface (MIPI) standard is incorporated in a frame defined by a communication standard via a network, wherein setting information indicating a number of lanes of the MIPI in A-PHY is stored in a packet header of the packet.

16. A non-transitory computer readable medium storing a program for causing a communication device to execute communication processing, the program being executable by a processor to perform operations comprising:

generating a packet having a packet structure in which a mobile industry processor interface (MIPI) standard is incorporated in a frame defined by a communication standard via a network, wherein setting information indicating a number of lanes of the MIPI in A-PHY is stored in a packet header of the packet.

* * * * *